Feb. 5, 1946.  A. C. DAMAN ET AL  2,393,976
AGITATING MEANS AND METHOD
Filed May 31, 1941   4 Sheets-Sheet 1
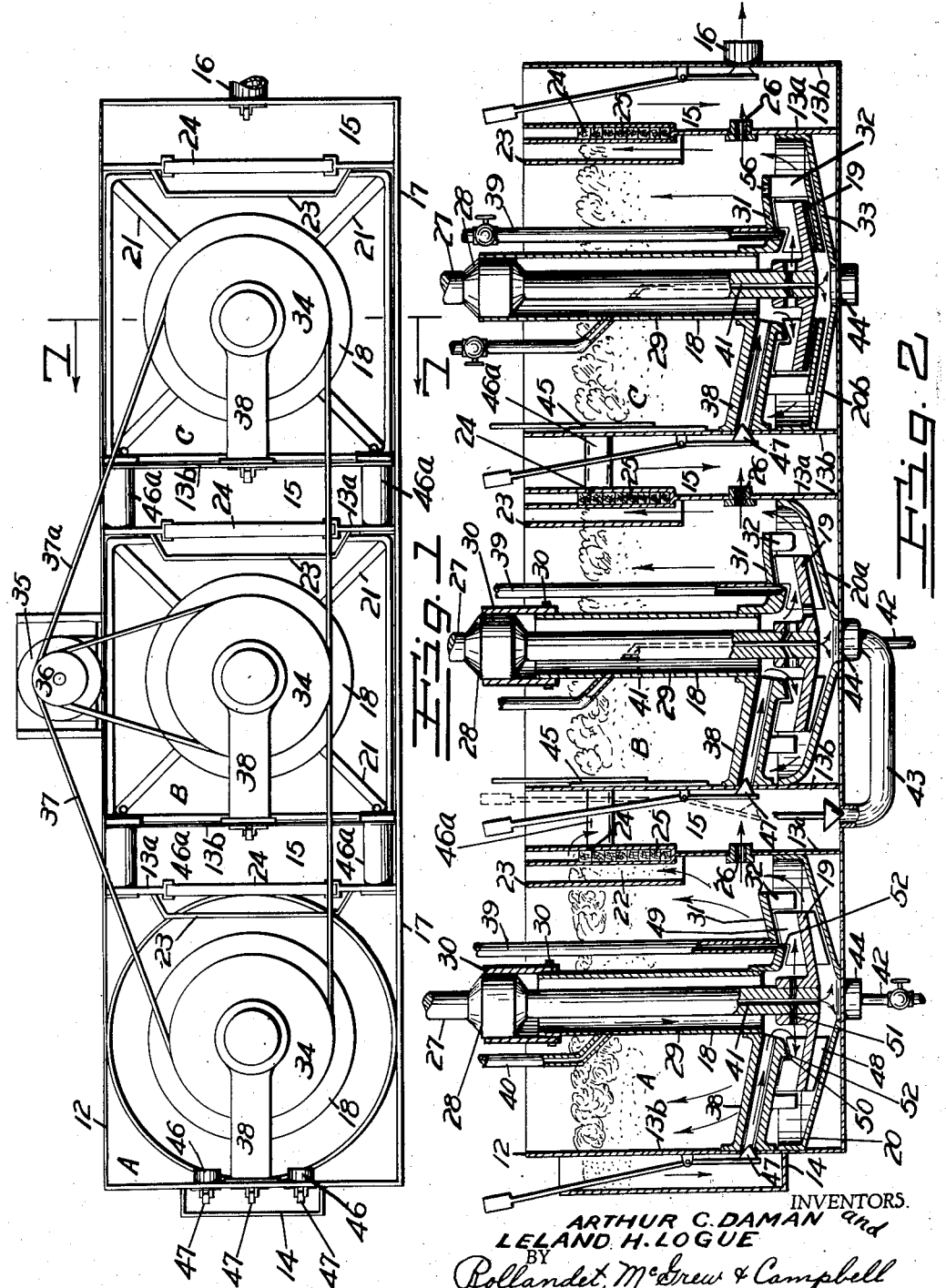
INVENTORS.
ARTHUR C. DAMAN and
LELAND H. LOGUE
BY
Rollandet, McGrew & Campbell
ATTORNEYS.

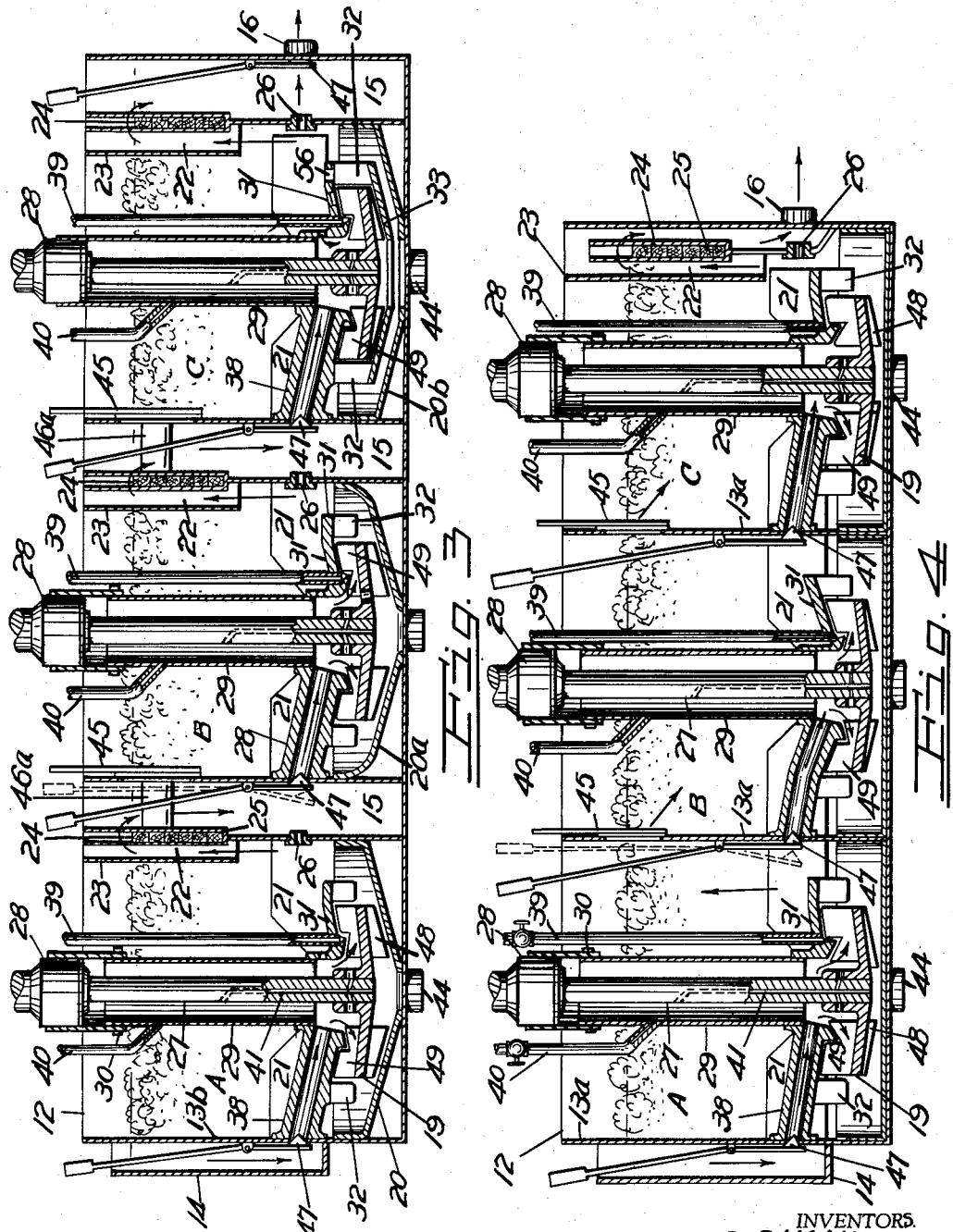

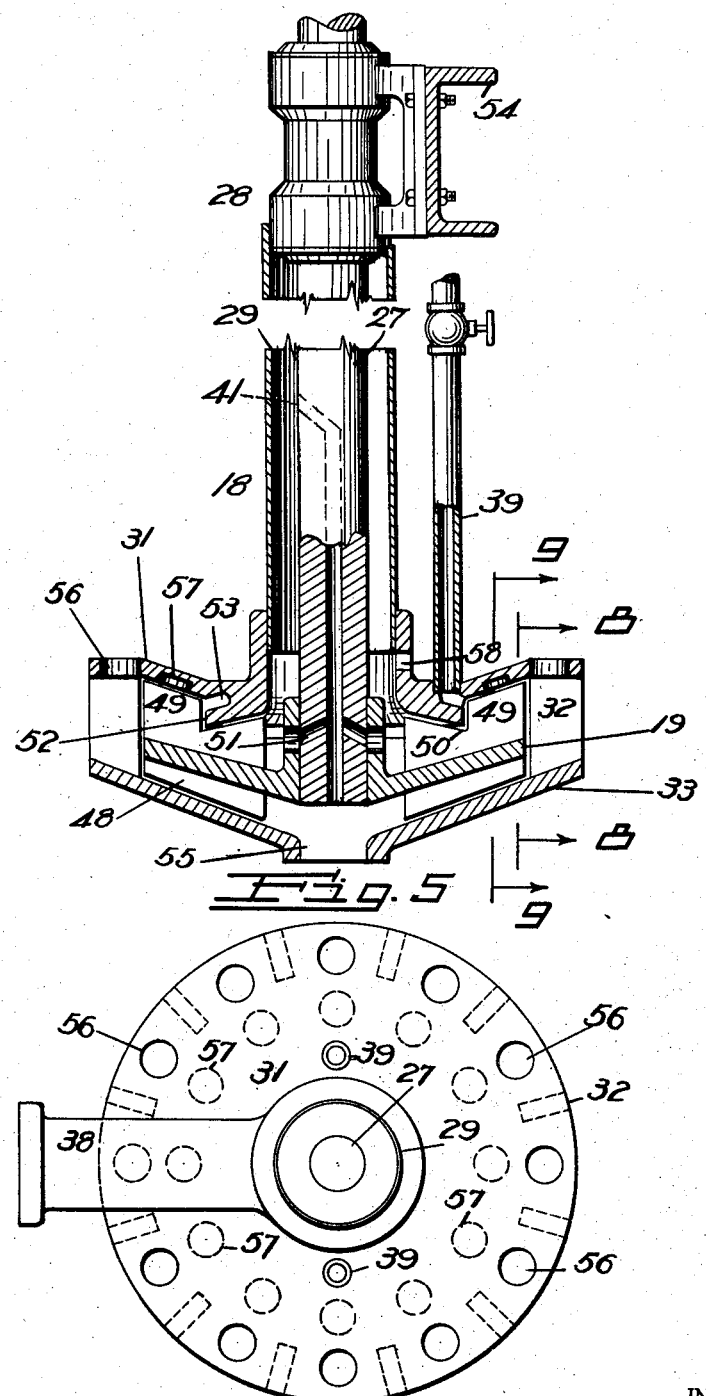

Feb. 5, 1946.   A. C. DAMAN ET AL   2,393,976
AGITATING MEANS AND METHOD
Filed May 31, 1941     4 Sheets-Sheet 4
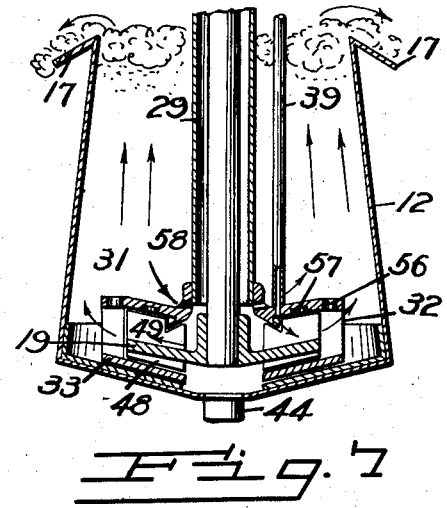
Fig. 7
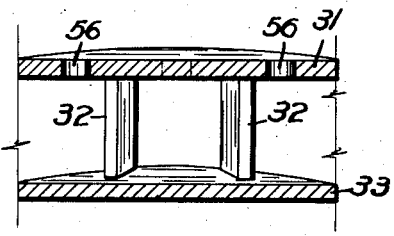 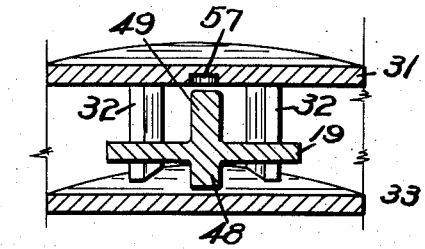
Fig. 8    Fig. 9
INVENTORS.
ARTHUR C. DAMAN
LELAND H. LOGUE
BY
Rollander, McGrew & Campbell
ATTORNEYS.

Patented Feb. 5, 1946

2,393,976

UNITED STATES PATENT OFFICE 2,393,976

AGITATING MEANS AND METHOD

Arthur C. Daman and Leland H. Logue, Denver, Colo., assignors to Mining Process and Patent Company, Denver, Colo., a corporation of Delaware Application May 31, 1941, Serial No. 396,064

29 Claims. (Cl. 209—169)

This invention relates to agitating and aerating means and methods and more particularly relates to control of the agitative action in froth flotation processes and the like.

Heretofore in the art of froth flotation, machines of the mechanical agitation type have required that the impellers constituting the agitators act on the entire volume of feed delivered to a given cell at a predetermined speed.

As such agitators have a two-fold function in the machine, namely, serving as a pump and also as a mixer, the power required to satisfy the maximum demands of both functions is often greatly in excess of the actual demands based on conditions within the cell at a given moment.

Even where variable speed motors are used to operate the impellers, optimum conditions are not obtained. Fluctuations of feed, for example, will cause conditions within the cell which at one moment demand that the impeller function primarily as a mixer or aerator, while at another moment they demand that it function primarily as a pump.

Consequently, a reduction in speed while satisfying the pumping requirements, frequently results in inadequate mixing, and conversely, increased speed while producing a desired degree of mixing, may cause undue agitation and flow of fluid through the cell.

It is an object of the present invention to provide a selective control for the delivery of a variable load of feed to the agitator permitting it to function under optimum conditions as a mixer or as a pump, according to changing conditions in the body of material under treatment.

Another object of the invention is to provide an improved mixing action within a rotary impeller of an agitator for the treatment of fluent matter.

A further object of the invention is the provision of control means in a multi-cell flotation machine permitting immediate variation of the functioning of the impellers therein either as mixing elements or as pumps.

Other objects reside in novel steps and treatments and novel combinations and arrangements of parts, all of which will appear more fully in the course of the following description.

To afford a better understanding of the invention, reference is made to the accompanying drawings illustrating structural arrangements embodying features of the invention. In the drawings in the several views of which like parts have been designated similarly, Figure 1 is a top plan view of a three-cell flotation machine embodying features of the present invention;

Figure 2 is a vertical central section taken through the machine of Figure 1;

Figure 3 is a similar vertical section illustrating a modified form of machine embodying features of the invention;

Figure 4 is a similar vertical section of another modified form of machine embodying features of the present invention;

Figure 5 is a vertical central section through an agitator unit embodying features of the present invention;

Figure 6 is a top plan view of the agitator unit illustrated in Figure 5;

Figure 7 is a section taken along the line 7—7 of Figure 1;

Figure 8 is a fragmentary section through the agitator of Figure 5, looking in the direction of the arrows 8—8 of Figure 5; and Figure 9 is a fragmentary section through the agitator of Figure 5, looking in the direction of the arrows 9—9 of Figure 5.

For convenience in illustration, the multi-cell embodiments of the present invention have been shown in three-cell machines, but it will be understood that according to the demands of the operation, any number of cells may be used.

Referring first to the form of machine illustrated in Figures 1 and 2, a tank 12 is divided by a series of co-acting partition elements 13a and 13b into a series of cells designated successively A, B and C. A feed box 14 is provided in the initial cell A of the series and the space between partitions 13a and 13b of adjoining cells provides feed compartments 15.

A final tailings discharge outlet 16 is provided in the final feed compartment 15 and one or more froth overflow lips 17 extend lengthwise along one or more sides of tank 12 and may have rotary skimmers or other mechanical means to assist froth removal. An agitator unit designated generally by the reference numeral 18 is located in each cell of the series and includes a rotary impeller 19 serving the double function of a pump and a mixer element.

The present invention is suited for use in a variety of flotation cells and to illustrate its adaptability to a variety of forms, the cell bottom 20 of cell A is conical, while the cell bottom 20a of cell B is of pyramid design and the cell bottom 20b of cell C is a modified pyramid design. Where restraint of agitation in the cell is desired, baffles 21 may be provided as illustrated in cells B and C. If desired, these baffles may be used as the supporting structure for the housing of impeller 19 which will be described subsequently.

The level regulation in the respective cells may be controlled in any suitable manner and has been illustrated in Figure 2 as embodying a weir overflow passage 22 formed by a partition 23 extending from the top of the cell to an elevation well below the liquid level determined by the height of a weir 24 which may be selectively varied by insertion or removal of slats 25. A sand relief hole 26 located at a distance below weir 24 conducts heavier solids not carrying over weir 24, from the respective cells into the feed compartments 15.

The impellers 19 are mounted on a rotary shaft 27 journalled in bearings 28 suitably supported on superstructure (not shown). A hollow column 29 is adjustably mounted as indicated at 30, on bearing 28 in encompassing relation to shaft 27 and carries at its lower end a hood 31 having about its periphery a series of depending vanes 32. In the form of hood structure illustrated in cell C the depending vanes 32 support an annular plate 33 in underhanging relation to impeller 19, the purpose of which will be explained hereinafter.

Features of the hood and vane structure have been described and claimed in the co-pending application of Arthur C. Daman and Leland H. Logue, Serial No. 242,334, filed November 25, 1938, Patent No. 2,243,309, and form no part of the present invention except as specifically noted hereinafter.

The impellers 19 may be driven in any suitable manner and a convenient arrangement has been illustrated in Figure 1. A series of sheaves 34 of uniform diameter are mounted on the respective shafts 27, and a motor 35 carrying a sheave 36 drives the sheaves 34 through the intermediary of two belts 37 and 37a.

Features of this driving arrangement are described and claimed in the patent of Leland H. Logue, No. 2,162,624, issued June 13, 1939.

Pulp is fed to the respective impellers 19 under the hood enclosure 31 from initial feed box 14 and successive feed compartments 15 through feed conduits 38 and descends directly onto the respective impellers 19.

Gas, either atmospheric or under pressure, may be delivered directly to the impellers 19 through the provision of conduits 39 or indirectly to the impellers through branches 40 connecting with columns 29 and passages 41 in shafts 27. Preferably, such gas supply conduits are valve-controlled to permit selective regulation of the gas delivered to the impellers for mixing.

Features of the gas delivery through passages 41 have been described and claimed in the co-pending application of Daman et al., Serial No. 337,420, filed May 27, 1940, and do not form a part of the present invention. However, certain features of improvement associated with this form of gas delivery will be specifically described hereinafter and claimed herein.

As an optional arrangement, gas under pressure also may be delivered through conduits 42 entering the respective cells through the bottom of tank 12. These conduits may be valve-controlled, if desired.

While the circulatory system in the preferred form of the invention involves the direct movement of pulp from feed box 14 and compartments 15 through conduits 38 directly to the impeller, an optional modification has been illustrated in Figure 2 in which the feed from compartment 15 between cells A and B may be conducted through a suitable valve-controlled passage 43 and bottom opening 44 beneath impeller 19 by which it is elevated for mixing within hood enclosure 31 prior to discharge in the usual manner across the periphery of impeller 19.

The features thus far described constitute either conventional practice or novel procedure and means already embodied in pending applications as acknowledged herein.

The present invention represents a departure from former practice in providing one or more pulp passages 46 into cell A from feed box 14, in addition to conduit 38 delivering pulp directly to the impeller. Adjustable valves 47 control the admission of pulp to passages 46 and inlet 38 and may be selectively positioned anywhere within a range from complete closure to complete opening of the conduit intakes. It will be apparent that with this arrangement, any predetermined proportion of the feed may be delivered directly to the impeller, while the remainder is delivered into the cell without passing directly to the impeller.

Similarly in successive cells, one or more by-pass conduits 46a are provided to carry pulp directly from a preceding cell to a succeeding cell while the remaining volume of pulp constituting feed to the given cell passes across weir 24 into feed compartment 15 and thence through feed inlet 38 directly to impeller 19. The passage of pulp or froth through conduits 46a is controlled by gates 45 and thus the distribution of feed to cells B, C or succeeding cells is controlled in the same way as the initial introduction of feed to cell A.

This arrangement provides a selective control for the functioning of the impeller by varying the load of pulp delivered to the impeller. When inlet 38 is operating at full capacity and the openings 46 or 46a are closed, the impeller functions primarily as a pump under conditions of high horsepower consumption.

When feed to the impeller is reduced by partially closing valve 47 controlling inlet 38 and partially opening valves 47 or gates 45 to permit flow of pulp through passages 46 or 46a respectively, the varied load on the impeller reduces its horsepower requirements and it becomes a greater aerator than a pump.

A typical illustration of this type of control will be cited. Assuming the normal volume of pulp delivered to the machine as 100% and the operation requires that cell A function only as a pump, passages 46 are closed by proper adjustment of valves 47 while conduit 38 is left wide open by proper adjustment of its valve 47. As a result, all pulp entering feed box 14 passes directly to impeller 19 through conduit 38.

In cell B the gates 45 are properly adjusted to admit 35% of the normal feed to the machine through each of by-pass conduits 46, while the remaining 30% enters cell B through inlet 38 by proper adjustment of its valve 47, and under such conditions impeller 19 of cell B is permitted to function primarily as an aerator because of the limited pulp load fed thereto.

Thus we see the impeller of cell A functioning primarily as a pump with aeration an incidental feature of its operation, whereas in cell B the impeller functions primarily as an aerator with pumping of pulp through the cell an incident to its aerating function.

This selective control of impeller action permits each cell in the series to function under optimum conditions and when fluctuations in feed to the machine are encountered, a simple and effective adjustment may be made to maintain the predetermined standard of operation.

In connection with the machine illustrated in Figures 1 and 2, it will be understood that the bottom openings 44 are only used when it is desired to circulate pulp from feed compartments 15 to succeeding cells by a suction action rather than by gravity flow as in the preferred form. Consequently, the openings 44 will be kept plugged in the usual operation of the machine.

The machine illustrated in Figure 3 is a substantial duplicate of the machine illustrated in Figure 2 except for the recirculation feature which will be described, together with other phases of the aerating action, in the subsequent description.

The form of machine illustrated in Figure 4 differs from the forms illustrated in Figures 2 and 3 in the elimination of the weir overflow regulation of the individual cells and the substitution of a single level regulating means in the last cell of the series.

As illustrated, this regulating element comprises an overflow weir 24 of the type previously described, although it will be understood that other regulating means such as a gate, valve, or the like, may be substituted therefor if desired.

As the essential features of the invention hereinbefore described are embodied in the various modifications illustrated, the parts have been designated by corresponding reference numerals and detailed description of their construction appears unnecessary.

The agitator elements 18 employed in the various cells of Figures 2, 3 and 4 are generally similar and involve the same principle of operation. However, some differences in details of construction are utilized and these will now be described.

Referring first to Figure 2, the impeller 19 of cell A comprises a dished disk mounted on shaft 27. The dished plate carries vanes 48 on its undersurface and blades 49 on its upper surface which are notched as indicated at 50. A transverse passage 51 in the hub portion of the impeller communicates with the passage 41 of the shaft to deliver gas to the upper surface of the impeller, as well as through the bottom opening underneath the impeller.

The cover element 31 is internally shouldered, as indicated at 52, to create a Venturi effect by the centrifugal discharge of matter across the impeller as it moves past the discharge outlet of conduit 39.

The arrangement of blades 49 to correspond in contour to the overhanging structure of cover element 31 assists in the creation of the Venturi action and thus produces a greater degree of mixing of gas, pulp and reagent than otherwise would be obtained.

In the forms shown in cells A and B of Figure 2, the cover element 31 does not have any bottom enclosure for the impeller as the impeller vanes 48 are positioned in such close proximity to the bottom portion 20 or 20a that a pumping action is exerted thereon to keep the bottom free from any settled matter.

In the form illustrated in cell C of Figure 2, the impeller carries only small vanes on its under surface and, as a consequence, the plate 33 is supported from cover element 31 in underhanging relation to the impeller to provide a more effective pumping action on the under portion of the tank.

The plate 31 in cell A is positioned in substantially parallel relation to the dished surface of impeller 19, while in the form shown in cells B and C, the top plate bends adjacent its periphery to assume a converging relation to the dished surface of plate 19.

In Figure 3, cells A and B have agitators which are substantial duplicates of the corresponding cells of Figure 2, with the exception that in all forms the cover element 31 is shaped similarly to the cover element 31 of cell B in Figure 2. Another distinction is found in the arrangement of the agitators of Figure 3 in that they are designed for a recirculating action not designated by reference numeral in Figure 3, but designated 58 in Figure 5.

In Figure 4 none of the agitator units are provided with bottom plates 33 but are positioned with the vanes in close proximity to the bottom of tank 12 to exert a sweeping action thereon. Otherwise these agitators correspond generally with those previously described except that the cover element 31 shown in cell B of Figure 4, is disposed at an abrupt inclination to the dished surface of impeller 19 rather than in parallel as in the other forms.

With this explanation of the structural relationships, reference will now be made to the large scale view of the agitator unit shown in Figure 5.

The agitator unit 18 of Figure 5 is typical of the agitators illustrated in the several views and is designed as a unit for installation in various types of apparatus, such as flotation cells, conditioning tanks, mixing vats and the like.

This unit comprises a rotary shaft 27 suitably journaled in a bearing structure 28, which is fixedly held on superstructure 54, or other supporting element. At its lower end shaft 27 carries an impeller 19 in the form of a dished disk. The lower end of shaft 27 is hollowed to provide passage 41 terminating at its upper end in a peripheral opening.

A hollow column 29 is held on bearing housing 28 which is mounted for limited lengthwise adjustment and supports column 29 in encompassing relation to shaft 27. At its lower end a cover element 31 is fastened on column 29 in overhanging relation to impeller 19. This cover element 31 is formed with an annular shoulder 52 adjacent its central portion and a peripheral recess 53 is provided in the shoulder 52, providing a discharge passage for one or more gas delivery conduits 39.

Lateral passages 51 in shaft 27 conduct a portion of the gas passing through passage 41 onto the upper surface of impeller 19 while the remainder passes through the end of shaft 27 and is distributed along the under surface of impeller 19.

In this form of agitator, depending vanes 32 at the periphery of cover element 31 support an annular plate 33 positioned under the impeller in substantially parallel relation to the under surface thereof. A central opening 55 in plate 33 permits intake of fluent matter under the suction influence of the impeller 19 induced by vanes 48 moving in proximity to plate 33.

At intervals about the periphery of plate 31 openings 56 are provided for the upward discharge of matter acted on by impeller 19. Between openings 56 and shoulder 52 a series of recesses 57 are provided in the under surface of cover 31.

The blade 49 on impeller 19 are notched as indicated at 50 to give clearance to the shoulder 52 of cover 31. As a consequence, during rotation of the impeller 19 the upper portion of blades 49 pass in close proximity to recess 53 through which gas from conduits 39 is discharging and the rush of material toward the periphery of impeller 19 produces a venturi effect which promotes mixing of gas with other fluent matter.

An opening 58 in the upper central portion of cover element 31 permits recirculation of fluent matter into the hood enclosure for mixing with other materials by the action of the impeller. When recirculation is not desired, this hole may be plugged.

In operation, this unit is disposed in a tank or other container in which mixing is to be performed. Fluent matter in the tank is drawn into the cover enclosure through bottom opening 55 and upper opening 58. Gas, either atmospheric or under pressure, is delivered through conduit 39 and preferably is subject to valve regulation (not shown).

Likewise, gas is supplied to hollow column 29 through a branch 40 (not shown in Figure 5) and descends through passage 41. A portion of this gas passes onto the upper surface of impeller 19 through lateral passage 51 while the remainder discharges into the body of fluent matter entering opening 55.

Gas and recirculating fluent matter receive an initial mixing centrally of the impeller due in part to their opposed movements and in part to the cascading action. Thereafter, centrifugal movement is imparted to this mixture by the action of blades 49.

As the mixture moves toward the periphery the blades 49 exert a pumping influence on gas in recess 53, and this combined with the rush of matter past the recess draws the gas rapidly therefrom into intimate intermixture with the mixture thrown toward the periphery.

The mixing action is further assisted by the provision of recesses 57. While they have been illustrated as of circular shape, it will be understood that they may be rectangular or other suitable contour. The blades force matter into these recesses and due to the resistance encountered therein, additional mixing occurs therein. This is particularly valuable in reducing any tendency toward coalescence in the gas within the fluent body.

While such action is progressing, the mixture resulting from introduction of gas into the fluent body entering opening 55 underneath the impeller is moving toward the peripheral outlets between vanes 32 in converging relation to the stream of matter being moved along the upper surface of the impeller.

Due to the centrifugal components imparted to such streams, they do not pass directly through the passages between vanes 32, but strike these vanes instead and receive compressive influences as a result of the restriction, and also receive further mixing as a result of the convergence of the streams.

A portion of the compressed intermixture escapes through openings 56 while the remainder ultimately passes between vanes 32 and into the tank. As the pressure releases from the entrained and dissolved gases, they rise through the liquid in the form of fine bubbles and carry to the surface.

From the foregoing description, it will be apparent that the agitator unit 18 produces a high degree of mixing before the aerated pulp or other matter is discharged from the zone of influence of the impeller into the fluent body within the container in which it operates.

While in its general arrangement of parts this structure involves the same combination of elements described and claimed in Daman et al. application Serial No. 242,334, there are a number of novel features in the present design, particularly in the provision of the Venturi action, the recirculation action through openings 58, the provision of the recesses 57 in the cover plate, and the design of the blades 49 on the impeller.

The variation in details of construction of the agitator units shown in the various cells of Figures 2, 3 and 4 do not appear to require specific description other than that hereinbefore contained, except to note that with respect to the cover element design shown in cell B of Figure 4, the flaring effect resulting from the inclination of the plate serves to increase the Venturi action by permitting a greater expansive movement of material acted on by the impeller.

With this understanding of the aerating function of the present agitator units, it will be apparent that when a given cell of a flotation machine, for example is regulated to divide incoming feed and thereby deliver a lesser amount of pulp directly to the impeller 19 than its normal capacity requires, the resulting reduction in horsepower requirements for the pumping action permits the impeller to function as an aerator delivering a much larger percentage of gas to the cell in proportion to the liquid-solids content than it could do under full load conditions.

The various structural modifications illustrated in the several views and particularly in the cells of Figures 2, 3 and 4, are intended as illustrations of different ways of practicing the invention, and in ordinary commercial practice the design of a given cell will be uniformly adopted for all the cells of a multi-cell machine.

However, in the case of special treatments it is sometimes desirable to operate certain of the impellers without a bottom closure and others with a bottom closure plate 33. Similarly, certain cells may be provided with the recirculation openings 58, while other cells are not required to carry on a recirculation treatment.

The aerator design of the present invention is suited for insertion as a replacement part in existing machines, as well as its incorporation in new machines.

The form of agitator 18 disclosed in cells A and B of Figures 2 and 3 and in all cells of Figure 4, does not have a bottom closure plate underhanging the impeller. Despite this, the aerating action within the hood enclosure is substantially the same as that described with reference to the action of Fig. 5, and particularly when the cell bottom is of the conical or pyramidal form illustrated.

The impeller 19 carrying vanes 48 is positioned in close proximity to the bottom and consequently exerts a strong suction influence on matter descending to the bottom or drawn in through opening 44, causing the same to move outwardly and upwardly into converging relation with the stream of material passing off the upper surface of impeller 19.

A further feature of control is provided by the adjustment of column 29 and cover plate 31. Thus if variation in the mixing action is desired, the fastenings 30 may be loosened and the cover elevated to give greater clearance with reference to blades 49. As a consequence, less suction influence will be exerted by such blades and gas will not be drawn in and mixed as rapidly. Conversely, by lessening the clearance, more rapid gas introduction is attained and a more thorough distribution and dispersion of the gas in the liquid body results.

In operations involving the use of reagents, reagent may be introduced through branch 40 or conduit 39 or fed directly into the cell or container when recirculation openings 58 are operated. Under such circumstances, a thorough and intimate intermixture of gas, reagent and pulp or other fluent matter is obtained within the impeller enclosure, and upon subsequent discharge, the surface reaction in conjunction with gas dispersion may be utilized to elevate matter to the surface in a froth.

Therefore, while the agitator unit 18 of the present invention is ideally suited for use in flotation treatments, it is in no sense limited to such application, but may be employed in various treatments where combined agitation and aeration are a desideratum.

While the usual operation of the machines illustrated in Figures 2, 3 and 4 will involve the delivery of a lesser quantity of pulp to the impellers 19 than the quantity of feed entering feed box 14, with consequent delivery of some feed from a preceding cell to a succeeding cell through passages 46a, for certain operations the original feed will be of less quantity than the volume fed to the impellers of succeeding cells.

In such a case, a counter flow through passages 46a will be obtained, and by regulation of gates 45 this condition can be controlled to provide a proper feed supply in a preceding cell for delivery to the impeller of a succeeding cell and thereby maintain the desired pulp level in the individual cells.

Changes and modifications may be availed of within the spirit and scope of the invention as defined in the hereunto appended claims.

What we claim and desire to secure by Letters Patent is:

1. In a multi-cell flotation machine, in which pulp from a preceding cell is delivered through a conduit directly to the impeller of a succeeding cell, the improvement which comprises conduit means extending from a preceding cell to a succeeding cell having a discharge outlet distant from the impeller of said succeeding cell, means associated with each cell for controlling the level of pulp in said cell, means controlling the flow of pulp through said conduit means, and individually-controlled means regulating the flow of pulp passing through the delivery conduit directly to the impeller.

2. In a multi-cell flotation machine, from which pulp from a preceding cell is delivered through a conduit directly to the impeller of a succeeding cell, the improvement which comprises a plurality of conduit means extending from a preceding cell to a succeeding cell, each having a discharge outlet distant from the impeller of said succeeding cell, means associated with each cell for controlling the level of pulp in said cell, individually-controlled means regulating the flow of pulp through said conduit means, and individually-controlled means regulating the flow of pulp passing through the delivery conduit directly to the impeller.

3. A flotation machine, comprising a tank divided into a plurality of cells and having a feed inlet and a discharge outlet determining a liquid level in the tank, a weir overflow for each cell determining the liquid level therein, a rotary impeller in each cell, a cover-element for the impeller, conductive means for delivering pulp to each impeller, conduits exclusive of said conductive means for delivering pulp into each cell of the series at a point remote from the impeller and below the level of the weir overflow, individually-regulated means controlling the flow of pulp through the conduits and through said conductive means, and means for varying the flow through the tank discharge outlet.

4. A flotation machine, comprising a tank divided into a plurality of cells and having a feed inlet and a discharge outlet determining a liquid level in the tank, a rotary impeller in each cell, a cover-element for the impeller, conductive means for delivering pulp to each impeller, conduits exclusive of said conductive means for delivering pulp into each cell of the series at a point remote from the impeller and below the liquid level in said cell, individually-regulated means controlling the flow of pulp through the conduits and through said conductive means, and means for varying the flow through the tank discharge outlet to control the liquid level in the respective cells.

5. In aerating apparatus, a rotary impeller, a hood for the impeller, means for feeding fluent matter centrally of the impeller, an annular shoulder on the inner surface of the hood projecting toward the impeller, there being a gas-delivery passage in said shoulder, and blades on the impeller having their top surfaces conforming in contour to the under surface of the hood.

6. In aerating apparatus, a rotary impeller, a stationary hood over the impeller, means for feeding fluent matter centrally of the impeller, an annular shoulder on the inner surface of the hood projecting toward the impeller, there being a gas-delivery passage in said shoulder, means for supplying gas centrally of the impeller and to the gas-delivery passage, and blades on the impeller having their top surfaces conforming in contour to the under surface of the hood.

7. In aerating apparatus, a rotary impeller, a stationary hood over the impeller, means for feeding fluent matter centrally of the impeller, an annular shoulder on the inner surface of the hood projecting toward the impeller, there being a gas-delivery passage in said shoulder, means for supplying gas to the gas-delivery passage and centrally of the upper and lower surfaces of the impeller, blades on the upper surface of the impeller having their top surfaces conforming in contour to the under surface of the hood, and vanes on the under surface of the impeller.

8. In aerating apparatus, a rotary impeller, a stationary hood over the impeller, means for feeding fluent matter centrally of the impeller, an annular shoulder on the inner surface of the hood projecting toward the impeller, there being a gas-delivery passage in said shoulder, means for supplying gas to the gas-delivery passage and centrally of the upper and lower surfaces of the impeller, blades on the upper surface of the impeller having their top surfaces conforming in contour to the under surface of the hood, vanes on the under surface of the impeller, and a stationary plate disposed beneath the impeller.

9. In flotation apparatus, a rotary impeller, blades on the upper surface of the impeller, a hood in overhanging relation to the impeller having a series of discharge apertures about its periphery, and vanes projecting downwardly from the hood about the periphery of the impeller, there being a series of separated recesses in the under surface of the hood in proximity to the path of rotation of the blades to trap matter elevated by the blades.

10. Aerating apparatus comprising a rotary shaft, an impeller on the shaft, a hollow column enclosing the shaft, a hood supported on the column in covering relation to the impeller, means for delivering gas through the column onto the impeller, an annular shoulder on the inner surface of the hood projecting toward the impeller, a gas-delivery conduit discharging through said shoulder, an apertured closure supported from the hood in encompassing relation to the periphery, and a centrally-apertured plate on the closure in underhanging relation to the impeller.

11. Aerating apparatus comprising a rotary shaft, an impeller on the shaft, a hollow column enclosing the shaft, a hood supported on the column in covering relation to the impeller, means for delivering gas through the column onto the impeller, an annular shoulder on the inner surface of the hood projecting toward the impeller, a gas-delivery conduit discharging through said shoulder, an apertured closure supported from the hood in encompassing relation to the periphery, and means for moving the hood toward and away from the impeller.

12. A flotation machine, comprising a tank divided into a plurality of cells and having a feed inlet and a discharge outlet determining a liquid level in the tank, a rotary impeller in the bottom portion of each cell, a cover-element disposed above and adjacent the impeller, conductive means for delivering pulp between each impeller and its associated cover, said chamber receiving pulp from the discharge outlet of the preceding cell, a conduit exclusive of said conductive means for delivering pulp from a preceding chamber into the upper portion of a succeeding cell, individually-regulated means for controlling the flow of pulp through said conduit, and individually regulated means for controlling another flow of pulp into the impeller through said conductive means.

13. A flotation machine, comprising a tank divided into a plurality of cells and having a feed inlet and a discharge outlet determining a liquid level in the tank, a rotary impeller in the bottom portion of each cell, a cover-element disposed above and adjacent the impeller, a compartment disposed between a preceding cell and a succeeding cell and having an inlet positioned to receive pulp from the preceding cell, conductive means having an intake in said compartment and a discharge outlet between the impeller and its associated cover in the succeeding cell, a conduit having an intake in said compartment and a discharge outlet in said succeeding cell at a point remote from the impeller, and means for selectively distributing the contents of said compartment between the conduit and said conductive means.

14. In aerating apparatus, a rotary impeller, a hood for the impeller, means for feeding fluent matter centrally of the impeller, an annular shoulder on the inner surface of the hood projecting toward the impeller, there being a gas-delivery passage in said shoulder, and blades on the impeller having slots in their top surfaces to provide clearance for said annular shoulder in the rotary movement of said blades.

15. In aerating apparatus, a rotary impeller, a hood for the impeller, means for feeding fluent matter centrally of the impeller, an annular shoulder on the inner surface of the hood projecting toward the impeller, there being a gas-delivery passage in said shoulder, blades on the impeller having slots in their top surfaces to provide clearance for said annular shoulder in the rotary movement of said blades, and means for changing the spacing between the hood and the impeller to vary the clearance between the blades and said gas-delivery passage.

16. In a continuous froth flotation process in which a body of ore pulp is aerated and circulated by the centrifugal action within a lower portion of the body, the improvement which comprises maintaining the zone of centrifugal action separated from the pulp body to prevent the direct descent of pulp thereto, delivering gas within said centrifugal zone for mixing with the pulp, dividing incoming feed to the pulp body, delivering one divided portion directly into the centrifugal zone by gravity to intermix with said gas therein, moving another divided portion into the pulp body by gravity at a point above said centrifugal zone, and varying the volume of one of the divided portions in accordance with volume fluctuations in the feed.

17. In a continuous froth flotation process in which a body of ore pulp is aerated and circulated by the centrifugal action within a lower portion of the body, the improvement which comprises maintaining the zone of centrifugal action separated from the pulp body to prevent the direct descent of pulp thereto, delivering gas within said centrifugal zone for mixing with the pulp, dividing incoming feed to the pulp body, delivering one divided portion directly into the centrifugal zone by gravity to intermix with said gas therein, moving another divided portion into the pulp body by gravity at a point above said enclosed zone, varying the volume of one of the divided portions in accordance with volume fluctuations in the feed, and recirculating portions of the pulp through the enclosed zone.

18. In a continuous froth flotation process in which a body of ore pulp is aerated and circulated by the centrifugal action within a lower portion of the body, the improvement which comprises maintaining the zone of centrifugal action separated from the pulp body to prevent the direct descent of pulp thereto, delivering gas within said centrifugal zone for mixing with the pulp, dividing incoming feed to the pulp body, delivering one divided portion directly into the centrifugal zone by gravity to intermix with said gas therein, moving another divided portion into the pulp body by gravity at a point above said enclosed zone, varying the volume of one of the divided portions in accordance with volume fluctuations in the feed, and recirculating untreated portions of the pulp through the zone of centrifugal action in controlled quantity.

19. In a continuous froth flotation process in which a body of ore pulp is aerated and circulated by the centrifugal action within a lower portion of the body, the improvement which comprises maintaining the zone of centrifugal action separated from the pulp body to prevent the direct descent of pulp thereto, delivering gas within said centrifugal zone for mixing with the pulp, dividing incoming feed to the pulp body, delivering one divided portion directly into the centrifugal zone by gravity to intermix with said gas therein, moving another divided portion into the pulp body by gravity at a higher elevation than said centrifugal zone, and varying the volume of one of the divided portions in accordance with volume fluctuations in the feed.

20. In aerating apparatus, a rotary impeller, a hood for the impeller defining therewith a pulp passage along the upper surface of the impeller, means for feeding fluent matter centrally of the impeller, said hood being constructed and arranged to narrow and then widen the passage for pulp between the feed introducing means and the periphery of the impeller, there being a gas-delivery passage through the hood in the zone where the pulp passage widens, and blades on the impeller for moving matter through said pulp passage.

21. A flotation machine, comprising a tank divided into a plurality of cells and having a feed inlet and a discharge outlet determining a liquid level in the tank, a weir overflow for each cell determining the liquid level therein, a rotary impeller in the lower portion of each cell, a cover element for the impeller, conductive means for delivering pulp to each impeller, conduits exclusive of said conduit means for delivering pulp into each cell of the series at a higher elevation than the impeller, individually-regulated means controlling the flow of pulp through the conduits and through said conductive means, and means for varying the flow through the tank discharge outlet.

22. In aerating apparatus, means for introducing a continuous stream of fluent matter into a confined zone, means for mixing the fluent matter with gas upon entrance into said zone, means for moving the resulting mixture through the confined zone in a centrifugal action, a flow path constricted intermediate its ends for compressing said mixture and enlarged beyond said constriction to allow the mixture to expand during the latter part of said movement, and means for introducing an additional stream of gas into the mixture at the commencement of said expansive action.

23. In aerating apparatus, means for introducing a continuous stream of fluent matter into a confined zone, means for mixing the fluent matter with gas upon entrance into said zone, means for moving the resulting mixture through the confined zone in a centrifugal action, a flow path constricted intermediate its ends for compressing said mixture and enlarged beyond said constriction to allow the mixture to expand during the latter part of said movement, and means for introducing an additional stream of gas into said mixture by said expansive action.

24. In flotation apparatus, a cell for pulp having a feed-supply compartment at one of its ends and a discharge outlet at its opposite end determining a liquid level therein, a rotary impeller in the lower portion of the cell, a cover for the impeller, and pulp-conducting means constructed and arranged to deliver a predetermined amount of pulp from the compartment to the cell without changing the liquid level therein, while varying the load of pulp delivered to said impeller, said means including conductive means for delivering at least part of the feed from the compartment between the impeller and its cover.

25. In flotation apparatus, a cell for pulp, a pulp-supply compartment at one end of the cell, a rotary impeller in the lower portion of the cell, a cover for the impeller said cell having a discharge outlet determining the volume of pulp passing through the cell and the liquid level in the cell, and pulp-conducting means constructed and arranged to deliver a predetermined amount of pulp from the compartment to the cell without changing the liquid level therein, while varying the load of pulp delivered to said impeller, said means including conductive means for delivering feed within the impeller enclosure from the supply compartment outside the cell.

26. In flotation apparatus, a cell for pulp, a pulp supply compartment at one end of the cell, a rotary impeller in the lower portion of the cell, a cover for the impeller, said cell having a discharge outlet determining the volume of pulp passing through the cell, and pulp-conducting means constructed and arranged to deliver a variable amount of pulp from the compartment to the impeller independently of the pulp volume regulation of the cell, said means including conductive means for delivering one portion of feed from the compartment outside the cell directly into the impeller enclosure and another portion of the feed to a point in the cell outside said impeller enclosure.

27. In aerating apparatus, means for introducing a continuous stream of fluent matter into a confined zone, means for mixing the fluent matter with gas upon entrance into said zone, means for moving the resulting mixture through the confined zone in a centrifugal action, a flow path constricted intermediate its ends for compressing said mixture and enlarged beyond said constriction to allow the mixture to expand, and means for introducing an additional stream of gas into the intermixture between the compression and expansion movements thereof.

28. In flotation apparatus, a cell, a rotary impeller in the cell, a hood over the impeller providing an enclosure therefor, a pulp-receiving compartment at an end of said cell, means, including a conduit, for delivering pulp from said compartment directly into the impeller enclosure, means for delivering pulp from the compartment into the cell at a point from which said impeller enclosure prevents its passage directly onto the impeller, and means for regulating the quantity of pulp admitted through each of said aforementioned means.

29. In flotation apparatus, a cell, a rotary impeller in the cell, a hood over the impeller providing an enclosure therefor, a pulp-receiving compartment at an end of said cell, valve-controlled means for delivering pulp from the compartment directly into the impeller enclosure, and valve-controlled means for delivering pulp into the cell at a point from which said enclosure prevents its passage directly onto the impeller.

ARTHUR C. DAMAN.
LELAND H. LOGUE.